US012554096B2

(12) United States Patent
Brown et al.

(10) Patent No.: US 12,554,096 B2
(45) Date of Patent: Feb. 17, 2026

(54) ACTUATOR ARRANGEMENT (71) Applicant: CAMBRIDGE MECHATRONICS LIMITED, Cambridge (GB)

(72) Inventors: Andrew Benjamin Simpson Brown, Cambridge (GB); James Howarth, Cambridge (GB); Stephen Matthew Bunting, Cambridge (GB); Oliver Hart, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 107 days.

(21) Appl. No.: 18/563,781

(22) PCT Filed: Jun. 1, 2022

(86) PCT No.: PCT/GB2022/051404
§ 371 (c)(1),
(2) Date: Nov. 22, 2023

(87) PCT Pub. No.: WO2022/254220
PCT Pub. Date: Dec. 8, 2022

(65) Prior Publication Data
US 2024/0369805 A1 Nov. 7, 2024

(30) Foreign Application Priority Data

Jun. 2, 2021 (GB) .................................. 2107916
Dec. 16, 2021 (GB) .................................. 2118340
Dec. 31, 2021 (GB) .................................. 2119159

(51) Int. Cl.
*G02B 7/09* (2021.01)
*G02B 13/00* (2006.01)
(Continued)

(52) U.S. Cl.
CPC ............. *G02B 7/09* (2013.01); *G02B 13/009* (2013.01); *G02B 27/646* (2013.01); *G03B 13/36* (2013.01);
(Continued)

(58) Field of Classification Search
CPC ...... G02B 7/09; G02B 13/009; G02B 27/646; G03B 13/36; G03B 2205/0076; G03B 5/04; H04N 23/687
See application file for complete search history.

(56) References Cited

U.S. PATENT DOCUMENTS 10,582,100 B1 * 3/2020 Ba-Tis .................. B81B 3/0021
2012/0019675 A1 1/2012 Brown
(Continued)

FOREIGN PATENT DOCUMENTS

CN 110784650 A 2/2020
CN 211266959 U 8/2020
(Continued)

OTHER PUBLICATIONS

Combined Search and Examination Report of GB Application 2119159.8 dated Sep. 6, 2022.
(Continued)

*Primary Examiner* — Jason A Flohre
(74) *Attorney, Agent, or Firm* — Van Hoven PC; Stefan D. Osterbur; Joshua Van Hoven (57) ABSTRACT

An actuator arrangement for use in a camera is disclosed. The camera comprises two or more camera elements including an image sensor and one or more optical elements for forming, or aiding forming of, an image of an object on the image sensor. The actuator arrangement comprises: a first part defining a first axis; a first actuator for providing a first type of movement of one or more of the camera elements relative to the first part; a second actuator for providing a
(Continued)

second, different type of movement of one or more of the camera elements relative to the first part; a controller configured to (a) cause the first actuator to move one or more of the camera elements so as to provide a first optical image stabilisation (OIS) effect, and (b) cause the second actuator to move one or more of the camera elements so as to provide a second OIS effect. The first and second OIS effects combine to provide an overall OIS effect that is greater than either of the first and second OIS effects.

12 Claims, 6 Drawing Sheets (51) Int. Cl.
G02B 27/64 (2006.01)
G03B 13/36 (2021.01)
H04N 23/68 (2023.01)
(52) U.S. Cl.
CPC ... *H04N 23/687* (2023.01); *G03B 2205/0076* (2013.01)

(56) References Cited

U.S. PATENT DOCUMENTS

| | | | |
|---|---|---|---|
| 2017/0219842 A1* | 8/2017 | Howarth | G02B 27/646 |
| 2018/0024329 A1 | 1/2018 | Goldenberg et al. | |
| 2018/0144196 A1* | 5/2018 | Vaziri | G06V 40/19 |
| 2018/0149833 A1* | 5/2018 | Lee | H04N 25/61 |
| 2018/0217475 A1 | 8/2018 | Goldenberg et al. | |
| 2021/0120162 A1* | 4/2021 | Tanaka | H04N 23/667 |
| 2021/0195073 A1 | 6/2021 | Saito et al. | |
| 2021/0266465 A1* | 8/2021 | Wang | G02B 13/0065 |
| 2023/0051763 A1* | 2/2023 | Choi | G03B 30/00 |
| 2024/0004265 A1* | 1/2024 | Liu | H04N 23/54 |

FOREIGN PATENT DOCUMENTS

| | | |
|---|---|---|
| WO | 2017072525 A1 | 5/2017 |
| WO | 2020145650 A1 | 7/2020 |
| WO | 2022111263 A1 | 6/2022 |

OTHER PUBLICATIONS

International Search Report and Written Opinion of PCT Application No. PCT/GB2022/051404 dated Nov. 16, 2022.

* cited by examiner

ACTUATOR ARRANGEMENT

CROSS-REFERENCE TO RELATED APPLICATIONS

This application is a national stage application under 35 U.S.C. § 371 of International Application No. PCT/GB2022/051404, filed Jun. 1, 2022, which claims priority of GB Patent Application Nos. 2107916.5, filed Jun. 2, 2021, 2118340.5, filed Dec. 16, 2021, and 2119159.8, filed Dec. 31, 2021, the disclosures of each of which are hereby incorporated by reference herein in their entireties.

FIELD

The present application relates, amongst other things, to an actuator arrangement, in particular an actuator arrangement comprising a first and second actuator, one or both of which may be a shape memory alloy (SMA) actuator.

BACKGROUND

SMA actuators are particularly useful for providing optical image stabilisation (OIS) in miniature cameras. For example, an SMA actuator as described in WO2011/104518 ('P284') can be used for providing so-called module-tilt OIS, an SMA actuator as described in WO2013/175197 ('P318') can be used for providing so-called lens-shift OIS, and an SMA actuator as described in WO2017/072525 ('P342') can be used for providing so-called sensor-shift OIS. Furthermore, an SMA actuator as described in WO2018/158590 ('P373') can be used for tilting a mirror or prism to provide OIS in a periscope camera.

The amount of movement (also referred to as 'stroke') that can be achieved with the typical length of SMA wire that can be accommodated within a miniature camera is limited.

Furthermore, a combination of optical image stabilisation and super-resolution imaging functionality has yet to be very successfully realized in this context.

SUMMARY

According to a first aspect of the present invention, there is provided an actuator arrangement for use in a camera, wherein the camera comprises two or more camera elements including an image sensor and one or more optical elements for forming, or aiding forming of, an image of an object on the image sensor, the actuator arrangement comprising:
  a first ('static') part defining a first axis;
  a first actuator for providing a first type of movement of one or more of the camera elements relative to the first part;
  a second actuator for providing a second, different type of movement of one or more of the camera elements relative to the first part;
  a controller configured to (a) cause the first actuator to move one or more of the camera elements so as to provide a first optical image stabilisation (OIS) effect, and (b) cause the second actuator to move one or more of the camera elements so as to provide a second OIS effect, wherein the first and second OIS effects combine to provide an overall OIS effect that is greater than either of the first and second OIS effects.

Thus, the overall OIS effect can be advantageously increased. This can be particularly important where the first and/or second actuators are SMA actuators, each of which can have a limited stroke as mentioned above.

As will be appreciated, providing an OIS effect generally comprises moving the image on the image sensor in one direction so as to compensate for movement of the image on the image sensor in another (opposite) direction due to motion of the camera ('shake').

The different types of movement may involve different movements (e.g. translation versus rotation) and/or movement of different combinations of the camera elements.

The one or more optical elements may comprise a lens for focusing, or aiding focusing of, an image of an object onto the image sensor.

The first actuator may be for moving the lens relative to the first part in any direction in a plane orthogonal to the first axis. The second actuator may be for moving the image sensor relative to the first part in any direction in a plane orthogonal to the first axis.

The controller may be configured, in response to a determination of a desired OIS effect, to (a) cause the first actuator to cause the lens to move in a first direction relative to the first part, and (b) cause the second actuator to cause the image sensor to move in a second direction relative to the first part, wherein the second direction is opposite to the first direction.

Thus, the relative motion between the lens and the image sensor is potentially doubled.

Instead of "shifting" the lens as specified above, the first actuator may be for tilting the lens relative to the first axis, which can produce a somewhat similar OIS effect.

The one or more optical elements may comprise a reflecting element (e.g. a mirror or a prism) for redirecting the optical path, e.g. in a periscope camera. A periscope camera may otherwise be referred to as a folded camera and may be defined as a camera having one or more reflectors to provide a lengthened optical path. The optical path may be folded through e.g. 90 degrees by the reflector.

The first actuator may be for tilting the reflecting element so as to move the image on the image sensor in any direction. Such tilting may involve tilting the reflecting element relative to a normal to the reflecting surface of the reflecting element. The second actuator may be for moving one of the lens and the image sensor relative to the first part in any direction in a plane orthogonal to the first axis.

The actuator arrangement may even comprise a third actuator for moving the other one of the lens and the image sensor relative to the first part in any direction in a plane orthogonal to the first axis. In such instances, the controller may be configured to (c) cause the third actuator to move the other one of the lens and the image sensor so as to provide a third OIS effect. The first, second and third OIS effects may combine to provide a greater overall OIS effect.

The first actuator may be for tilting a module comprising the lens and the image sensor relative to the first axis (in this case, the first actuator may be referred to as a module tilt actuator). The second actuator may be for moving at least one of the lens and the image sensor relative to the module in any direction in a plane perpendicular to an optical axis of the lens.

The second actuator may be a so-called lens shift actuator or a so-called sensor shift actuator or might be an actuator assembly comprising both a lens shift actuator and a sensor shift actuator as specified above and in claim 2.

The controller may be configured to (a) cause the first actuator to move one or more of the camera elements so as to primarily compensate for movement (e.g. due to shake) of the image on the image sensor in a first frequency range, and (b) cause the second actuator to move one or more of the camera elements so as to primarily compensate for movement of the image on the image sensor in a second, different frequency range.

The movement in the first frequency range may comprise movement with lower frequencies and higher amplitudes than the movement in the second frequency range.

This can be particularly advantageous where the first actuator is a module tilt actuator which is particularly suitable for compensating for such lower-frequency, higher-amplitude movement.

A similar principle can be applied where there are three actuators.

The controller may be configured to:
  obtain an input signal indicative of motion of the camera relative to the object, the input signal originating from a sensor that is fixed relative to the first part;
  provide a first control signal to the first actuator, wherein the first control signal is derived from the input signal; and
  provide a second control signal to the second actuator, wherein the second control signal is derived from the input signal and a signal indicative of the position of the first actuator.

Alternatively, the controller may be configured to:
  obtain a first input signal indicative of motion of the first part relative to the object, the first input signal originating from a sensor that is fixed relative to the first part;
  provide a first control signal to the first actuator, wherein the first control signal is derived from the first input signal;
  obtain a second input signal indicative of motion of the module relative to the object, the second input signal originating from a sensor that is fixed relative to the module; and
  provide a second control signal to the second actuator, wherein the second control signal is derived from the second input signal.

The actuator arrangement may comprise the sensor(s).

According to a second aspect of the present invention, there is provided an actuator arrangement for use in a camera, wherein the camera comprises two or more camera elements including an image sensor and one or more optical elements for forming, or aiding forming of, an image of an object on the image sensor, the actuator arrangement comprising:
  a first part defining a first axis;
  a first actuator for providing a first type of movement of one or more of the camera elements relative to the first part;
  a second actuator for providing a second, different type of movement of one or more of the camera elements relative to the first part;
  a controller configured to (a) cause the first actuator to move one or more of the camera elements so as to provide an optical image stabilisation (OIS) effect, and (b) cause the second actuator to move one or more of the camera elements so as to provide for at least super-resolution imaging.

Thus, the second example provides a more flexible and effective way, i.e. using two different actuators (with different characteristics) of providing for OIS and super-resolution imaging.

As will be appreciated, providing super-resolution imaging generally comprises moving the image on the image sensor between two or more positions that are offset from each other by a distance that is less than a pitch of the pixels of the image sensor. The pixel pitch refers to the distance between the centres of two adjacent pixels.

The second actuator may be further configured to move one or more of the camera elements to provide a further OIS effect. The further OIS effect may be less than the OIS effect. The OIS effect and the further OIS effect may combine to provide an overall OIS effect that is greater than either of OIS effect and the further OIS effect.

The first actuator may be for tilting a module comprising the lens and the image sensor relative to the first axis. The second actuator may be for moving at least one of the lens and the image sensor relative to the module in any direction in a plane perpendicular to an optical axis of the lens.

Such a first actuator (i.e. a module tilt actuator) may be particularly suitable for providing the OIS effect and such a second actuator (i.e. a lens shift or sensor shift actuator) may be particularly suitable for providing for super-resolution imaging (and optionally a further OIS effect).

The one or more optical elements may include a lens for focusing, or aiding focusing of, an image of an object onto the image sensor. Additionally or alternatively, the one or more optical elements may include a reflecting element for redirecting the optical path.

The first actuator may be for moving the lens relative to the first part in any direction in a plane orthogonal to the first axis and the second actuator may be for moving the image sensor relative to the first part in any direction in a plane orthogonal to the first axis. In this way, the first actuator may be a lens shift actuator and the second actuator may be a sensor shift actuator.

The following may apply to the first or second aspect.

The actuator arrangement may comprise: a first movable part for supporting the one or more of the camera elements that are movable relative to the first part; and a second movable part for supporting the one or more of the camera elements that are movable relative to the first part and/or the first movable part. The first actuator may be for moving the first movable part relative to the first part. The second actuator may be for moving the second movable part relative to the first part and/or the first movable part.

The first actuator, the second actuator or each of the first and second actuators may comprise a shape memory alloy (SMA) actuator.

There may be provided a camera module comprising: an actuator arrangement as specified above; the one or more optical elements; and the image sensor.

There may be provided a camera module comprising: an actuator arrangement as specified above; the lens; and the image sensor.

According to a third aspect of the present invention, there is provided a method of controlling an actuator arrangement for use in a camera, wherein the camera comprises two or more camera elements including an image sensor and one or more optical elements for forming, or aiding forming of, an image of an object on the image sensor, the actuator arrangement comprising:
  a first part defining a first axis;
  a first actuator for providing a first type of movement of one or more of the camera elements relative to the first part;
  a second actuator for providing a second, different type of movement of one or more of the camera elements relative to the first part;
  the method comprising:

causing the first actuator to move one or more of the camera elements so as to provide a first optical image stabilisation (OIS) effect; and causing the second actuator to move one or more of the camera elements so as to provide a second OIS effect; wherein the first and second OIS effects combine to provide an overall OIS effect that is greater than either of the first and second OIS effects.

According to a fourth aspect of the present invention, there is provided a method of controlling an actuator arrangement for use in a camera, wherein the camera comprises two or more camera elements including an image sensor and one or more optical elements for forming, or aiding forming of, an image of an object on the image sensor, the actuator arrangement comprising:

a first part defining a first axis;

a first actuator for providing a first type of movement of one or more of the camera elements relative to the first part;

a second actuator for providing a second, different type of movement of one or more of the camera elements relative to the first part;

the method comprising:

causing the first actuator to move one or more of the camera elements so as to provide an optical image stabilisation (OIS) effect; and causing the second actuator to move one or more of the camera elements so as to provide for super-resolution imaging.

There may be provided a non-transitory computer-readable medium having stored thereon instructions which, when executed by a controller, cause the controller to perform the method.

According to a fifth aspect of the present invention, there is provided an actuator arrangement comprising:

a first ('static') part defining a first axis;

a first actuator for providing a first type of movement of a first element and/or a second element relative to the first part;

a second actuator for providing a second, different type of movement of the first element and/or the second element relative to the first part;

a controller configured to (a) cause the first actuator to move the first element and/or the second element so as to provide a first displacement of the first element relative to the second element, and (b) cause the second actuator to move the first element and/or the second element so as to provide a second displacement of the first element relative to the second element, wherein the first and second displacements combine to provide an overall displacement of the first element relative to the second element that is greater than either of the first and second displacements.

Thus, such an actuator arrangement has uses other than in providing OIS.

In any of the first to fourth aspects, the first axis may be perpendicular to a light-sensitive region of the image sensor when the image sensor is in a neutral position.

According to a sixth aspect of the present invention, there is provided an actuator arrangement for use in a camera, the camera comprising an image sensor and a lens for focusing, or aiding focusing of, an image of an object onto the image sensor, the actuator arrangement comprising:

a first part defining a first direction;

a first actuator configured to move the lens relative to the first part, wherein the movement comprises rotation of the lens about any axis perpendicular to the first direction and passing through a centre of the lens;

a second actuator configured to move the image sensor relative to the first part, wherein the movement comprises rotation of the image sensor about any axis perpendicular to the first direction and passing through a centre of the image sensor;

wherein the rotation of the lens is substantially the same as the rotation of the image sensor; and wherein the first actuator is configured such that the movement of the lens further comprises translational movement and/or the second actuator is configured such that the movement of the image sensor further comprises translational movement so as to substantially maintain the position and of the lens relative to the image sensor.

According to a seventh aspect of the present invention, there is provided an actuator arrangement for use in a camera, the camera comprising an image sensor and a lens for focusing, or aiding focusing of, an image of an object onto the image sensor, the actuator arrangement comprising:

a first part defining a first direction;

a first actuator configured to move a first element relative to the first part, the first element corresponding to one of the lens and the image sensor, wherein the movement comprises translation of the first element in any direction perpendicular to the first direction in a first range of movement and rotation of the first element about any axis perpendicular to the first direction in a second range of movement;

a second actuator configured to move a second element relative to the first part, the second element corresponding to the other one of the lens and the image sensor, wherein the movement comprises rotation of the second element so as to substantially maintain the orientation of the lens relative to the image sensor during the rotational movement of the first element.

The third, fourth and fifth aspects etc. of the present invention may include any suitable feature of the first and second aspects etc.

Any of the actuator arrangements may be part of a portable electronic device, such as a mobile telephone or a wearable device, such as smart glasses or augmented reality glasses.

BRIEF DESCRIPTION OF THE DRAWINGS

Certain embodiments of the present invention will now be described, by way of example only, with reference to the accompanying drawings in which.

DETAILED DESCRIPTION

Reference Example

Figure 1:
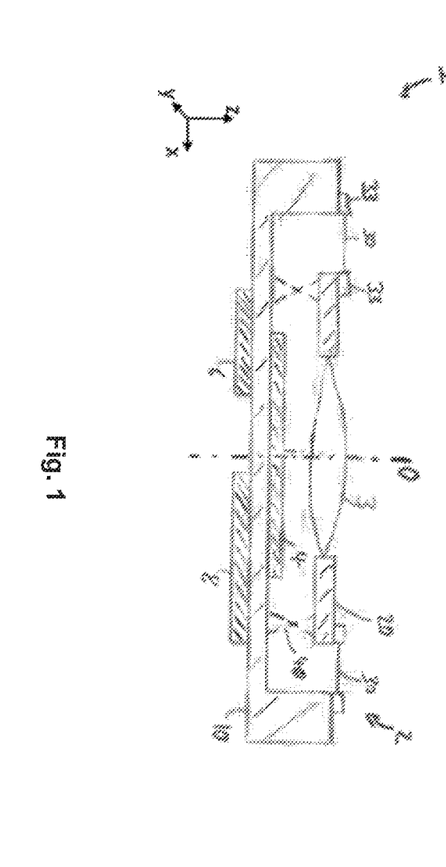
FIG. 1 is a schematic view of a camera apparatus corresponding to a reference example.

FIG. 1 schematically shows a camera apparatus 1 that incorporates an SMA actuator assembly 2. The camera apparatus 1 is to be incorporated in a portable electronic device such as a mobile telephone, smart glasses (e.g. augmented reality glasses) or tablet computer. Thus, miniaturization is an important design criterion.

The SMA actuator assembly 2 comprises a support structure 10 and a movable part 20. The movable part 20 is supported on the support structure 10. The movable part 20 is movable relative to the support structure 10. The movable part 20 may be movable in a plane, in particular in the x-y plane. Additionally or alternatively, the movable part 20 may be movable along a primary axis, in particular along the z-axis.

The SMA actuator assembly 2 comprises one or more SMA wires 30. The SMA wires 30 may be connected in tension between the support structure 10 and the movable part 20. The SMA wires 30 may be connected at their ends to the support structure 10 and/or to the movable part 20 using connection elements 33, for example crimp connections. The crimp connections may crimp the SMA wires to hold them mechanically, as well as providing electrical connections to the SMA wires 30. However, any other suitable connections may alternatively be used. The SMA wires 30 are capable, on selective contraction, of driving movement of the movable part 20 with respect to the support structure 10.

The movable part 20 may be supported (so suspended) on the support structure 10 exclusively by the SMA wires 30. However, preferably, the SMA actuator assembly 2 comprises a bearing arrangement 40 that supports the movable part on the support structure 10. The bearing arrangement 40 may have any suitable form for allowing movement of the movable part 20 with respect to the support structure 10. For this purpose, the bearing arrangement 40 may, for example, comprise a rolling bearing, a flexure bearing or a plain bearing. The bearing arrangement may allow movement in the x-y plane. The bearing arrangement 40 may constrain or prevent movement of the movable part 20 relative to the support structure 10 along the z-axis. The bearing arrangement 40 may constrain movement in the x-y plane within a particular range of movement. Alternatively, the bearing arrangement may allow movement along the z-axis. The bearing arrangement 40 may constrain or prevent (translational) movement of the movable part 20 relative to the support structure 10 in the x-y plane.

The camera apparatus 1 further comprises a lens assembly 3 and an image sensor 4. The lens assembly 3 comprises one or more lenses configured to focus an image on the image sensor 4. The image sensor 4 captures an image and may be of any suitable type, for example a charge coupled device (CCD) or a CMOS device. The lens assembly 3 comprises a lens carrier, for example in the form of a cylindrical body, supporting the one or more lenses. The one or more lenses may be fixed in the lens carrier, or may be supported in the lens carrier in a manner in which at least one lens is movable along the optical axis O, for example to provide zoom or focus, such as auto-focus (AF). The camera apparatus 1 may be a miniature camera apparatus in which the or each lens of the lens assembly 3 has a diameter of 20 mm or less, preferably of 12 mm or less. For ease of reference, the z axis is taken to be the optical axis O of the lens assembly 3 and the x and y axes are perpendicular thereto. In the desired orientation of the lens assembly 3, the optical axis O is perpendicular to a light-sensitive region of the image sensor 4 and the x and y axes are parallel to the light-sensitive region of image sensor 4.

In the example shown in FIG. 1, the movable part 20 comprises the lens assembly 3. The image sensor 4 may be fixed relative to the support structure 10, i.e. mounted on the support structure 10. In other examples, the lens assembly 3 may be fixed (e.g. in the x-y plane) relative to the support structure 10 and the movable part 20 may comprise the image sensor 4. In either example, in operation the lens assembly 3 is moved relative to the image sensor 4. Moving the lens assembly 3 relative to the image sensor 4 orthogonally to the optical axis O (i.e. in the x-y plane) has the effect that the image on the image sensor 4 is moved. This is used to provide optical image stabilization (OIS), compensating for image movement of the camera apparatus 1, caused for example by a user's handshake. Moving the lens assembly 3 relative to the image sensor 4 along the optical axis O (i.e. along the z-axis) has the effect that the amount of focus of the image on the image sensor 4 is adjusted. This is used to provide auto-focus (AF) or zoom functionality.

The camera apparatus 1 may comprise a vibration sensor 6 and a control circuit 8. The vibration sensor 6 may be a gyroscope sensor, for example, although in general other types of vibration sensor 6 could be used. The vibration sensor 6 detects vibrations that the camera apparatus 1 is experiencing and generates output signals representative of the vibration of the camera apparatus 1. The control circuit 8 may be implemented in an integrated circuit (IC) chip. The control circuit 8 generates drive signals for the SMA wires 30 in response to the output signals of the vibration sensor 6. SMA material has the property that on heating it undergoes a solid-state phase change that causes the SMA material to contract. Thus, applying drive signals to the SMA wires 30, thereby heating the SMA wires 30 by allowing an electric current to flow, will cause the SMA wires 30 to contract and move the movable part 20. The drive signals may be chosen to drive movement of the movable part 20 in a manner that stabilizes the image sensed by the image sensor 4 and/or in a manner that changes the amount of focus of the image on the image sensor 4. The control circuit 8 supplies the generated drive signals to the SMA wires 30.

The schematic of FIG. 1 is just one generic example of an actuator assembly that uses SMA to move a movable part relative to a support structure. The following examples may include any suitable actuator assembly in which an SMA wire is arranged to move the movable part relative to the support structure.

First Example ('Sensor Shift and Lens Shift')

Figure 2:
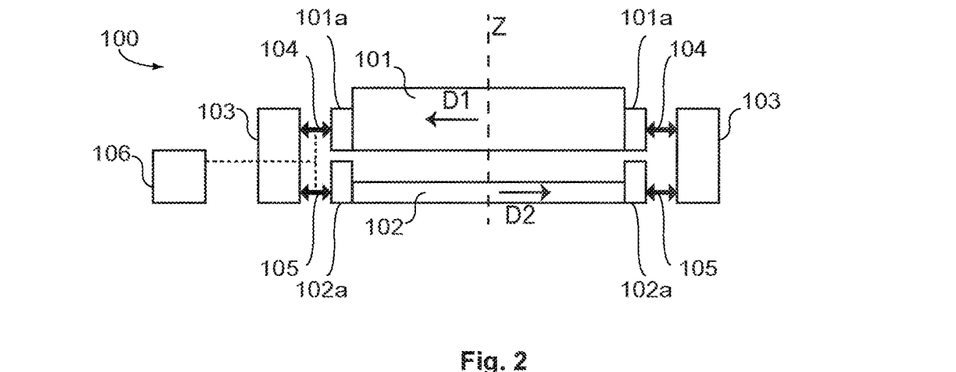
FIG. 2 is a schematic view of a first example of an actuator arrangement in which a lens and an image sensor are generally moved in opposite directions so as to provide an overall OIS effect.

Referring to FIG. 2, a first example of an actuator arrangement 100 will now be described.

The actuator arrangement 100 is for use in a miniature camera which includes a lens 101 and an image sensor 102. The lens 101 is for focusing, or (e.g. together with other lenses) aiding focusing of, an image of an object onto the image sensor 102.

The actuator arrangement 100 includes a first ('static') part 103. A first axis Z is defined with reference to the static part 103. The first axis Z may correspond e.g. to the optical axis of the lens 101 when the lens 101 is in a central position.

The actuator arrangement 100 includes a first ('lens shift') actuator 104 for moving the lens 101 relative to the static part 103 in any direction in a plane orthogonal to the first axis Z. The first actuator (the details of which are not shown in the drawing) may correspond to an actuator assembly as described above and/or as described in WO2013/175197 ('P318') which is incorporated herein by reference. The first actuator 104 may include a 'first' movable part 101a to which the lens 101 is attached.

The actuator arrangement 100 includes a second ('sensor shift') actuator 105 for moving the image sensor 102 relative to the static part 103 in any direction in a plane orthogonal to the first axis Z. The second actuator (the details of which are not shown in the drawing) may correspond to an actuator assembly as described above and/or as described in WO2017/072525 ('P342') which is incorporated herein by reference. The second actuator 105 may include a 'second' movable part 102a to which the image sensor 102 is attached.

The actuator arrangement 100 includes a controller 106. The controller 106 (the details of which are not shown in the drawing) may include a processor, memory and an input/output (I/O) interface. The processor may take the form of one or more general purpose digital electronic central processing units (CPU). The memory may include volatile memory and/or non-volatile memory. Typically, the memory may include a mixture of non-volatile memory for storing instructions and volatile memory for run-time usage by the processor. In some examples, a combination, or even all, of the elements of the controller 106 may be provided by a single suitably-configured microcontroller, application-specific integrated circuit (ASIC), or similar device.

The controller 106 is configured to cause the first (lens shift) actuator 104 to move the lens 101 relative to the static part 103 (and hence relative to the image sensor 102) so as to provide a first OIS effect. The controller 106 is further configured to cause the second (sensor shift) actuator 105 to move the image sensor 102 relative to the static part 103 (and hence relative to the lens 101) so as to provide a second OIS effect. The controller 106 is configured to operate in such a way that the first and second OIS effects combine to provide an overall OIS effect that is greater than either of the first and second OIS effects. In particular, the controller 106 is configured, in response to a determination of a desired OIS effect (e.g. a desired movement of the image on the image sensor 102), to:
- cause the first (lens shift) actuator 104 to cause the lens 101 to move in a first direction D1 relative to the static part 103; and
- cause the second (sensor shift) actuator 104 to cause the image sensor 102 to move in a second direction D2 relative to the static part 103, wherein the second direction D2 is opposite to the first direction D1.

Thus, the relative motion between the lens 101 and the image sensor 102 is potentially doubled.

Second Example ('Sensor Shift and Module Tilt')

Figure 3:
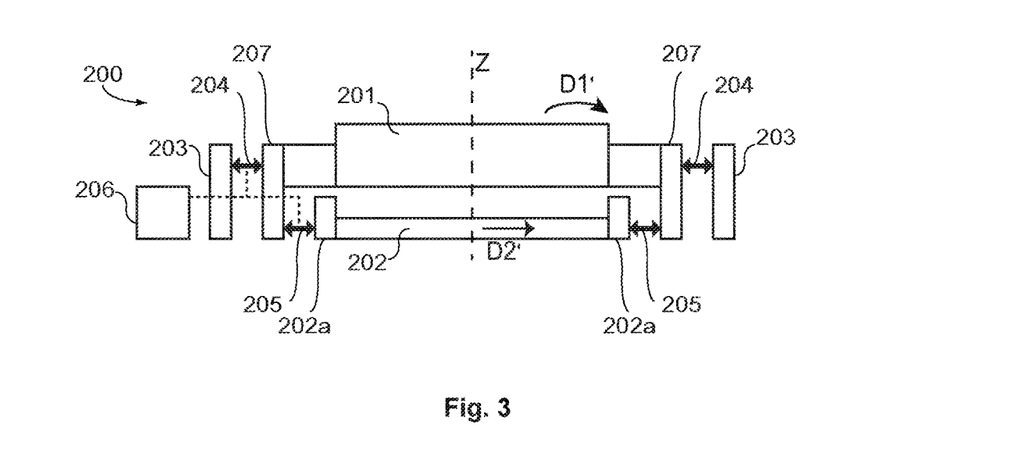
FIG. 3 is a schematic view of a second example of an actuator arrangement in which a module is tilted and a lens is moved relative to an image sensor so as to provide an overall OIS effect.

Referring to FIG. 3, a second example of an actuator arrangement 200 will now be described.

The actuator arrangement 200 is for use in a miniature camera which includes a lens 201 and an image sensor 202. The lens 201 is for focusing, or (e.g. together with other lenses) aiding focusing of, an image of an object onto the image sensor 202.

The actuator arrangement 200 includes a first, 'static' part 203. A first axis Z is defined with reference to the static part 203. The first axis Z may correspond e.g. to the optical axis of the lens 201 when the lens 201 is in a central position and orientation.

The actuator arrangement 200 includes a first ('module tilt') actuator 204 for tilting a module 207 including the lens 201 and the image sensor 202 relative to the first axis Z, i.e. rotating the module 207 about any axis perpendicular to the first axis Z. The first actuator 204 (the details of which are not shown in the drawing) may correspond to an actuator assembly as described in WO2011/104518 ('P284') which is incorporated herein by reference.

The actuator arrangement 100 includes a second ('sensor shift') actuator 205 for moving the image sensor 202 relative to the module 207 in any direction in a plane perpendicular to an optical axis of the lens 201. The second actuator 205 (the details of which are not shown in the drawing) may correspond to an actuator assembly as described above and/or as described in WO2017/072525 ('P342') which is incorporated herein by reference. The second actuator 204 may include a 'second' movable part 202a to which the image sensor 202 is attached.

The actuator arrangement 200 includes a controller 206 which may be the same as, or similar to, the above-described controller 106.

The controller 206 is configured to cause the first (module tilt) actuator 204 to tilt the module 207 including the lens 201 and the image sensor 202 relative to the first axis Z so as to provide a first OIS effect. The controller 206 is further configured to cause the second (sensor shift) actuator 205 to move the image sensor 202 relative to the module 207 (and hence relative to the lens 201) so as to provide a second OIS effect.

The controller 206 is configured to operate in such a way that the first and second OIS effects combine to provide an overall OIS effect (e.g. a total movement of the image on the image sensor 202) that is greater than either of the first and second OIS effects. For example, the controller 206 may be configured, in response to a determination of a desired OIS effect, to:
- cause the first (module tilt) actuator 204 to tilt the module 207 such that an upper part thereof has a movement component in a first direction D1' perpendicular to the first axis Z; and
- cause the second (sensor shift) actuator 204 to cause the image sensor 202 to move in a second direction D2' relative to the first part, wherein the first and second directions D1', D2' coincide or are parallel when viewed along the first axis Z.

Alternatively or additionally, the controller 206 may be configured to:
- cause the first (module tilt) actuator 204 to tilt the module 207 so as to primarily compensate for movement (e.g.

due to shake) of the image on the image sensor 202 in a first frequency range; and cause the second (sensor shift) actuator 205 to move the image sensor 202 so as to primarily compensate for movement of the image on the image sensor 202 in a second, different frequency range. In other words, the second actuator 205 can be used to remove a different portion of the motion spectrum to the first actuator 204.

The movement in the first frequency range may comprise movement with lower frequencies and higher amplitudes than the movement in the second frequency range. As mentioned above, these operations can be particularly advantageous where the first actuator 203 is a module tilt actuator. However, equivalent operations can also be carried out in connection with other actuator arrangements, e.g. the above-described first example.

In some variations of the second example, the camera includes a 'first' sensor 208 (e.g. a gyroscope and/or accelerometer) that is fixed relative to (e.g. mounted on) the static part 203.

In such variations, the controller 206 may be configured to:

obtain a 'first' input signal which originates from the first sensor 208 and which is indicative of motion of the camera relative to the object being imaged;

derive a 'first' control signal from the first input signal and provide the first control signal to the first actuator 204;

obtain a 'position' signal indicative of the position of the first actuator 204 (e.g. based on a resistance measurement of the SMA wires therein); and derive a 'second' control signal from the first input signal and from the position signal and provide the second control signal to the second actuator 205.

In other words, control of the first and second actuators 204, 205 is carried out in two 'phases'.

In some other variations of the second example, the camera includes a first sensor 208 as described above and also a 'second' sensor (e.g. a gyroscope and/or accelerometer) that is fixed relative to (e.g. mounted on) the module 207.

In such variations, the controller 206 may be configured to:

obtain a 'first' input signal which originates from the first sensor 208 and which is indicative of motion of the static part 203 (and the camera) relative to the object being imaged;

derive a 'first' control signal from the first input signal and provide the first control signal to the first actuator 204;

obtain a 'second' input signal which originates from the second sensor 208 and which is indicative of motion of the module 207 relative to the object being imaged; and derive a 'second' control signal from the second input signal and provide the second control signal to the second actuator 205.

Third Example ('Lens Shift and Module Tilt')

Figure 4:
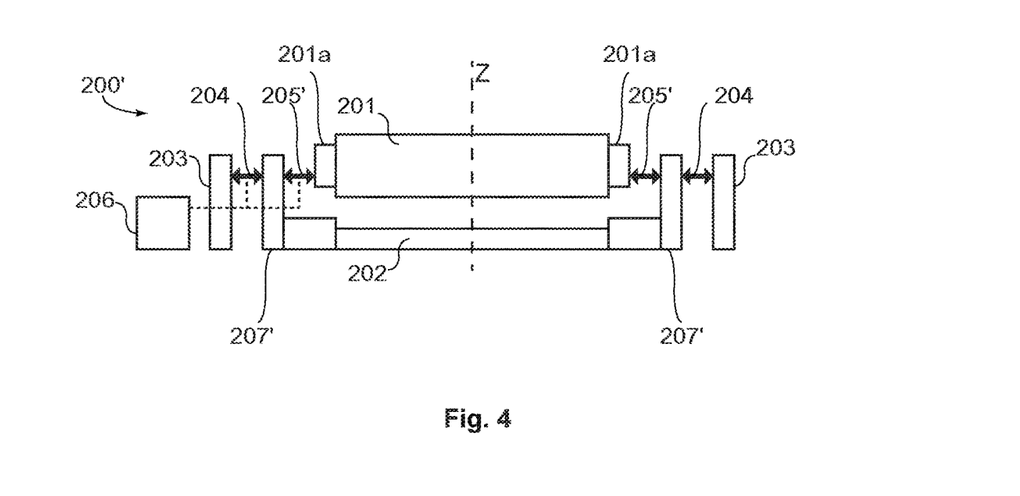
FIG. 4 is a schematic view of a third example of an actuator arrangement in which a module is tilted and a lens is moved relative to an image sensor so as to provide an overall OIS effect.

Referring to FIG. 4, a third example of an actuator arrangement 200' will now be described.

The actuator arrangement 200' is the same as the above-described actuator arrangement 200 except that the second actuator 205' is a 'lens shift' actuator for moving the lens 201 relative to the module 207' in any direction in a plane perpendicular to an optical axis of the lens 201. The second actuator 205' (the details of which are not shown in the drawing) may correspond to an actuator assembly as described above and/or as described in WO2013/175197 ('P318') which is incorporated herein by reference.

Method of Controlling the Actuator Assemblies

Figure 5:
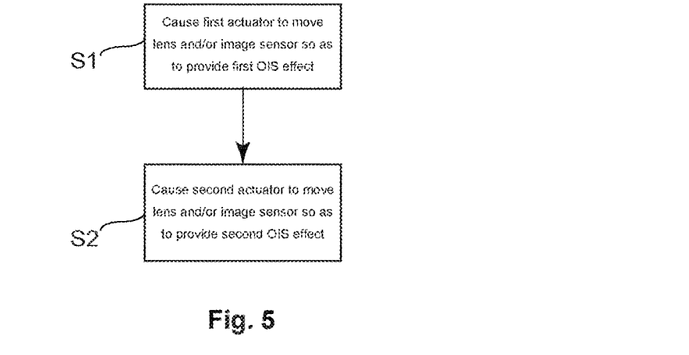
FIG. 5 is flow diagram illustrating a first method of controlling the actuator arrangement of FIG. 2.

Referring to FIG. 5, a method of controlling one of the above-described actuator assemblies 100, 200, 200' will now be described in general terms. The method may be performed by the controller 106, 206 executing instructions stored in its memory.

A first step S1 of the method involves causing the first actuator to move the lens and/or the image sensor so as to provide a first OIS effect.

A second step S2 of the method involves causing the second actuator to move the lens and/or the image sensor so as to provide a second OIS effect. The first and second OIS effects combine to provide an overall OIS effect that is greater than either of the first and second OIS effects.

Fourth Example ('Module Tilt and Super Resolution') and Related Control Method

Referring once again to FIGS. 3 and 4, a fourth example of an actuator arrangement will now be described.

In a first variation, the fourth actuator arrangement corresponds to the actuator arrangement 200 as described above with reference to FIG. 3. In a second variation, the fourth actuator arrangement corresponds to the actuator arrangement 200' as described above with reference to FIG. 4.

In both variations, the controller 206 is differently programmed/configured.

In particular, the controller 206 is configured to cause the first (module tilt) actuator 204 to tilt the module 207 including the lens 201 and the image sensor 202 relative to the first axis Z so as to provide a first OIS effect as described above. However, in the fourth example, the first OIS effect corresponds to the overall OIS effect, i.e. there is no second OIS effect.

The controller 206 is further configured to cause the second (sensor shift or lens shift) actuator 205, 205' to move the image sensor 202 relative to the lens 201 so as to provide for super-resolution imaging. In other words, the second actuator 205 is configured to move the image sensor 202 relative to the lens 201 so as to move the image on the image sensor 202 between two or more positions that are offset from each other by a distance that is less than a pitch of the pixels of the image sensor 202. In simple terms, images may be captured at each of these positions and a super-resolution image can be formed from a combination of these images.

The combination of the images is easier (and less images are required) if the motion is uniform across the whole image. However, if the camera is not at a fixed position and orientation then the image will move due to the movement of the camera. In a comparative example, this motion can be cancelled at the centre using OIS actuators such as lens shift or sensor shift actuators and then these actuators can be controlled to apply the desired deliberate (super-resolution) motion for one region of the image (i.e. the actuator arrangement of the first example may be employed to achieve OIS and super-resolution image an analogous way to that described above for the fourth example). However, the distortion of the image from correcting for the motion of the camera is typically so large that when the motion is correct at one region (e.g. at the centre of the image) it is not correct at other regions of the image. This means that the deliberate (super-resolution) displacement of the image on the image sensor 202 between different, e.g. consecutive, images may not be sufficiently uniform to allow the images to be simply combined.

However, using a module tilt actuator to provide for OIS does not distort the image, and so the above-described issue does not arise. An ideal module tilt actuator would be able to cancel the effect of camera shake on the position of the image and superimpose a deliberate motion to allow super-resolution to be performed. However, many module tilt actuators are not fast enough or accurate enough to cancel the handshake well enough for super-resolution or to generate the deliberate motion required for super-resolution.

The fourth example provides a solution to these issues by having a lens shift actuator 205' or preferably a sensor shift actuator 205 mounted in the module 207 camera to cancel the residual motion and apply the deliberate motion required for super resolution.

Figure 6:
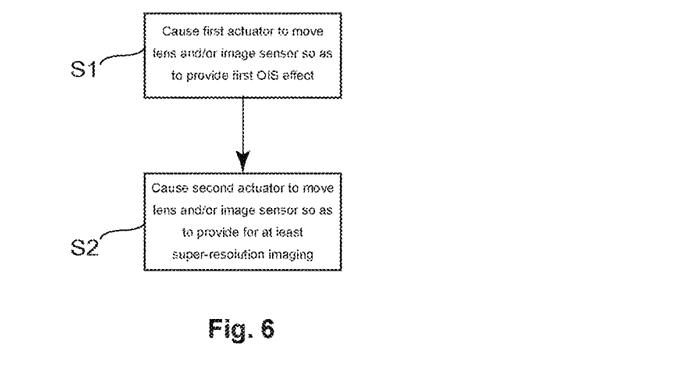
FIG. 6 is flow diagram illustrating a second method of controlling the actuator arrangement of FIG. 2.

Referring to FIG. 6, a method of controlling the fourth actuator assembly will now be described in general terms. The method may be performed by the controller 206 executing instructions stored in its memory.

A first step S1 of the method involves causing the first actuator to move the lens and/or the image sensor so as to provide a first OIS effect.

A second step S2 of the method involves causing the second actuator to move the lens and/or the image sensor so as to provide for at least super-resolution imaging. As explained above, the second actuator may be further configured to move the lens and/or image sensor to provide a further OIS effect.

Fifth Example

Figure 7:
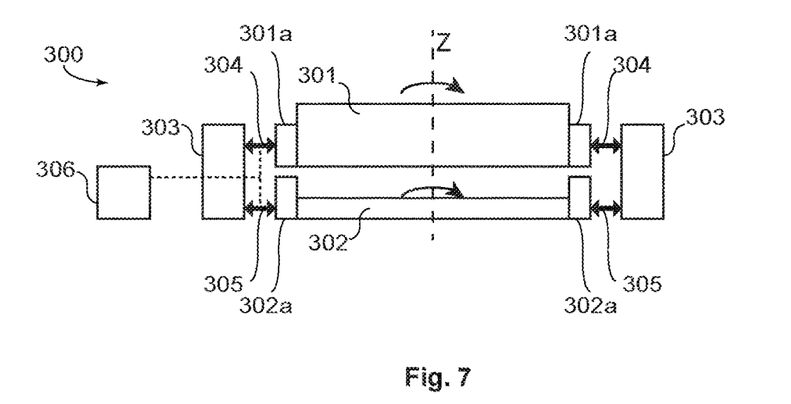
FIG. 7 is a schematic view of a fifth example of an actuator arrangement.
Figure 8:
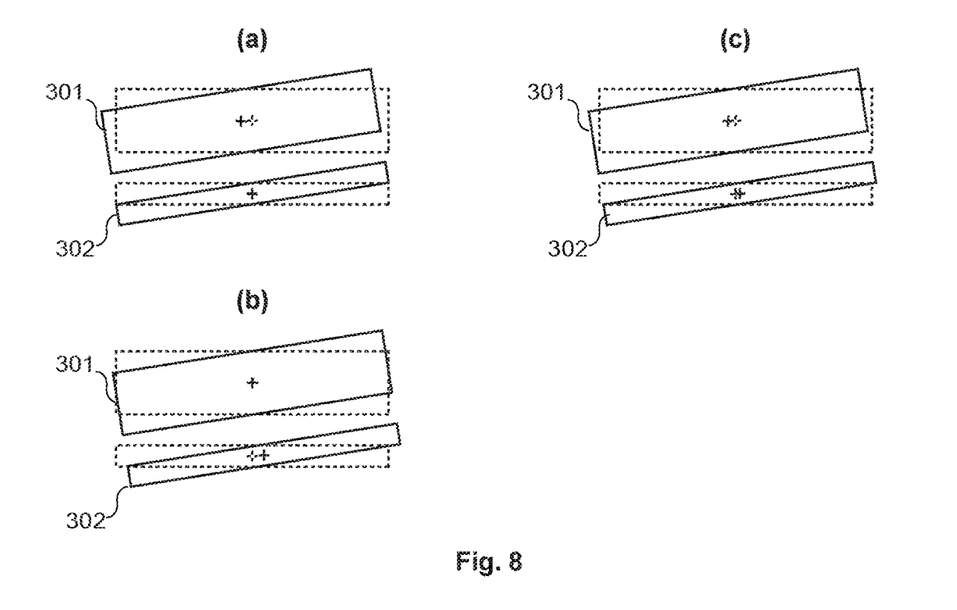
FIG. 8 is a schematic view of three variations (a), (b) and (c) of the actuator arrangement of FIG. 7 when moving from an initial, central position (dashed line) to a tilted position (solid line)

Referring to FIGS. 7 and 8, a fifth example of an actuator arrangement 300 will now be described.

The actuator arrangement 300 is for use in a miniature camera which includes at least one lens 301 (hereinafter referred to as simply the lens 301) and an image sensor 302. The lens 301 is for focusing, or (e.g. together with other lenses) aiding focusing of, an image of an object onto the image sensor 302.

The actuator arrangement 300 includes a first ('static') part 303. A first axis Z is defined with reference to the static part 303. The first axis Z may correspond e.g. to the optical axis of the lens 301 when the lens 301 is in a central position.

The actuator arrangement 300 includes a first (lens) actuator 304 for moving the lens 301 relative to the static part 303 in any direction and for rotating the lens 301 about any axis. The first actuator 304 (the details of which are not shown in the drawing) may correspond to an actuator assembly as described in WO2011/104518 ('P284') which is incorporated herein by reference. The first actuator 304 may include a 'first' movable part 301a to which the lens 301 is attached.

The actuator arrangement 300 includes a second ('sensor') actuator 305 which, equivalently to the first actuator 304, is for moving the image sensor 302 relative to the static part 303 in any direction and for rotating the image sensor 302 about any axis. The second actuator 305 may also correspond to an actuator assembly as described in WO2011/104518 ('P284'). The second actuator 305 may include a 'second' movable part 302a to which the image sensor 302 is attached.

In each of the three variations described below, the controller 306 is configured to control the first (lens) actuator 304 and the second (sensor) actuator 305 to cause each of the lens 301 and the image sensor 302 to:

rotate about its centre and, in particular, rotate about an axis parallel to the X axis passing through its centre and/or about an axis parallel to the Y axis passing through its centre;

and/or translate in directions parallel to the X, Y and/or Z axes.

The centre of the lens 301 and the image sensor 302 are indicated by crosses in FIG. 8.

In each instance, the effect of these movements is to cause both the lens 301 and the image sensor 302 to tilt in the same way relative to an axis parallel to the first axis Z, while at least substantially maintaining the relative configuration of the lens 301 and the image sensor 302, i.e. maintaining the distance between the lens 301 and the image sensor 302 (unless AF is being performed simultaneously, as described below) and maintaining that the optical axis of the lens 301 passes through the centre of the image sensor 302. Hence the movements provide an OIS (and/or super-resolution) effect akin to module tilt.

In a first main variation (see FIG. 8a), the second (sensor) actuator 305 is controlled so as to merely rotate about its centre. Accordingly, the first (lens) actuator 304 is controlled so as to rotate and translate as described above. As can be seen, the centre of the lens 301 is shifted in the X and/or Y directions and also in the Z direction.

In a second main variation (see FIG. 8b), the first (lens) actuator 304 is controlled so as to merely rotate about its centre. Accordingly, the second (sensor) actuator 305 is controlled so as to rotate and translate as described above. As can be seen, the centre of the image sensor 302 is shifted in the X and/or Y directions and also in the Z direction.

In a third main variation (see FIG. 8c), the first (lens) actuator 304 is controlled so as to rotate and translate as described above, and the second (sensor) actuator 305 is controlled so as to rotate and translate as described above. As can be seen, the centres of both the lens 301 and the image sensor 302 are shifted in the X and/or Y directions and also in the Z direction. In the illustrated example, these shifts are equal and opposite. However, this need not be the case.

Each of the first, second and third variations described above may have benefits in terms of manufacturing cost, performance, etc. in different circumstances. In each of these variations, the actuator arrangement 300 may include a bearing arrangement (not shown in the figures) configured to guide or constrain the movement of either the lens 301 or the image sensor 302, for example such that the relevant part 301 or 302 merely tilts.

The benefit of the actuator arrangement 300 over an arrangement in which the lens and the image sensor are not tilted are:

The distance that the projected image is moved on the image sensor 302 is increased because the tilt increases the translation of the lens 301.

If the lens 301 and the image senor 302 are simply translated with respect to each other, then there is a degree of image distortion. Tilting the lens 301 and the image sensor 302 can reduce or eliminate this distortion.

In some examples, the first and second actuators 304, 305 may be configured to move one or both of the lens 301 and the image sensor 302 so as to change the distance between the lens 301 and the image sensor 302 and provide an AF effect.

In some examples, instead of precisely maintaining that the optical axis of the lens 301 passes through a point at the centre of the image sensor 302, the actuator arrangement 300 may allow this point to move somewhat during operation. In other words, the X/Y translation of the lens 301 and/or the image sensor 302 may differ somewhat from that required to maintain this point at the centre of the image sensor 302.

If the image sensor 302 is merely rotated about its top surface, and the lens 301 is merely rotated about its optical centre (i.e. a point which is an effective focal length from the image sensor 302), then the principal ray though the lens 301 will still fall on the same point of the image sensor 302 and there is generally no significant change to the image and so no beneficial effect. This is therefore preferably avoided.

Sixth Example

Figure 9:
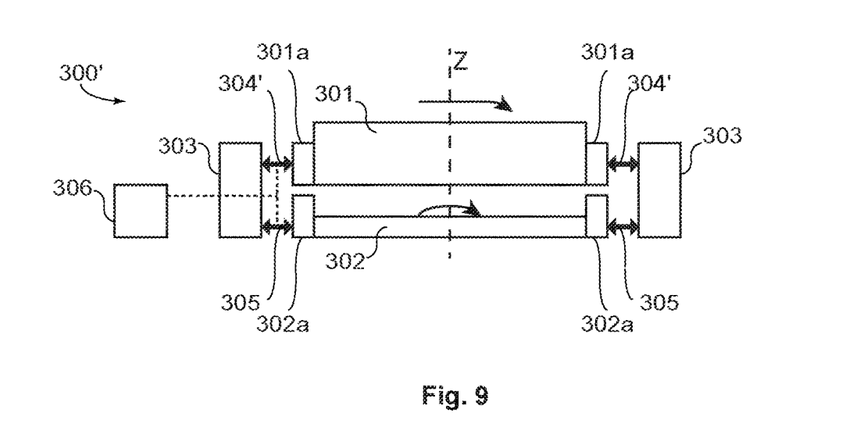
FIG. 9 is a schematic view of a sixth example of an actuator arrangement.
Figure 10:
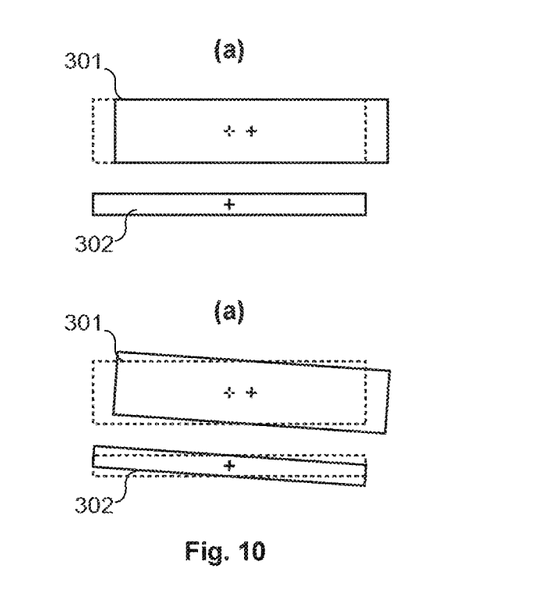
FIG. 10 is a schematic view of the actuator arrangement of FIG. 9 wherein (a) the lens moves translationally in a first range of movement and (b) the lens and the image sensor tilt in a second range of movement.

Referring to FIGS. 9 and 10, a sixth example of an actuator arrangement 300' will now be described.

The actuator arrangement 300' is the same as the above-described fifth example except that, for example, the first (lens) actuator 304' corresponds to a 'shift-and-tilt' actuator as described in WO2020/074900 ('P418') which is incorporated herein by reference. This shift-and-tilt actuator 304' can be configured to:
  translationally move the movable part, i.e. the lens 301, in X and/or Y directions over a first range of movement (see FIG. 10a), and then
  tilt the lens 301 (e.g. rotate about an axis parallel to the X-axis and/or an axis parallel to the Y-axis) over a second range of movement (see FIG. 10b).

This can be achieved with a lens shift actuator and a suitable bearing arrangement, e.g. flexures, as described in WO2020/074900.

The tilting extends the amount by which an image can be moved on the image sensor 302 but introduces relative tilt between the lens 301 and the image sensor 302 which would normally negatively affect image quality and, in particular, cause blurring at the edges of the image.

However, in this example, the second (sensor) actuator 305 is configured to tilt the image sensor 302 to at least substantially the same angle as the lens 301 and hence reduce or eliminate such blurring (see FIG. 10b).

Alternatively or additionally, the second (sensor) actuator 305 may correspond to the shift-and-tilt actuator as described above.

Seventh Example ('Periscope Camera')

Figure 11:
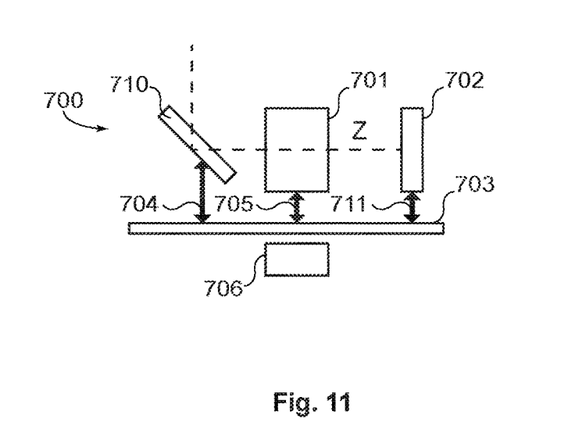
FIG. 11 is a schematic view of a seventh example of an actuator arrangement.

Referring to FIG. 11, a seventh example of an actuator arrangement 700 will now be described.

The actuator arrangement 700 is for use in a miniature periscope camera which includes a reflecting element in the form of a mirror 710, a lens 701, and an image sensor 702. The mirror 710 is for redirecting the optical path, e.g. by 90°. The lens 701 is for focusing, or (e.g. together with other lenses) aiding focusing of, an image of an object onto the image sensor 702.

The actuator arrangement 700 includes a first ('static') part 703. A first axis Z is defined with reference to the static part 703. The first axis Z may correspond e.g. to the optical axis of the lens 701 when the lens 701 is in a central position.

The actuator arrangement 700 includes a first ('mirror tilt') actuator 704 for tilting the mirror 710 so as to move the image on the image sensor 702 in any direction. Such tilting may involve tilting the mirror 710 relative to its normal (e.g. rotating about any axis perpendicular to the normal and passing through a point on the normal). The first actuator 704 (the details of which are not shown in the drawing) may correspond to an actuator as assembly as described in WO2018/158590 ('P373'), which is incorporated herein by reference. The first actuator 704 may include a 'first' movable part to which the mirror 710 is attached.

The actuator arrangement 700 includes a second ('lens shift') actuator 705 for moving the lens 701 relative to the static part 703 in any direction in a plane orthogonal to the first axis Z. The second actuator 705 (the details of which are not shown in the drawing) may correspond to an actuator assembly as described above and/or as described in WO2013/175197 ('P318') which is incorporated herein by reference. The second actuator 705 may include a 'second' movable part to which the lens 701 is attached.

The actuator arrangement 700 includes a third ('sensor shift') actuator 711 for moving the image sensor 702 relative to the static part 703 in any direction in a plane orthogonal to the first axis Z. The third actuator 711 (the details of which are not shown in the drawing) may correspond to an actuator assembly as described above and/or as described in WO2017/072525 ('P342') which is incorporated herein by reference. The third actuator 711 may include a 'third' movable part to which the image sensor 702 is attached.

The actuator arrangement 700 includes a controller 706 which may be the same as, or similar to, the above-described controller 106. The controller 706 is configured to control the first, second and third actuators 704, 705, 711 to move the mirror 710, lens 701 and image sensor 702, respectively, to provide first, second, and third OIS effects, respectively. The controller 706 is configured to operate in such a way that the first, second and third OIS effects combine to provide an overall OIS effect that is greater than any one (or any pair) of the first, second and third OIS effects.

In some examples, one (or more) of the first, second and third actuators 704, 705, 711 may be used primarily to provide an OIS effect and a different one (or more) of the first, second and third actuators 704, 705, 711 may be used primarily for super-resolution as described above.

In some examples, one of the first, second and third actuators 704, 705, 711 may be omitted. For example, the actuator arrangement may include only the first ('mirror tilt') actuator 704 and the third ('sensor shift') actuator 711.

In examples in which the first ('mirror tilt') actuator is present, when the mirror 710 is tilted about an axis which lies in the page (such that the image on the image sensor 702 moves left to right, when the image sensor is viewed face-on), the image on the image sensor rotates and so the image sensor 702 may need to be rotated about an axis perpendicular to the light-sensitive region of the image sensor to compensate for this. When the mirror 710 is tilted about an axis coming out of the page (such that the image on the image sensor moves up and down when the image sensor 702 is viewed face-on), the image on the image sensor does not rotate and so no compensatory rotation of the image sensor is required.

SMA Wire

The above-described SMA actuators comprise SMA wire. The term 'SMA wire' may refer to any element comprising SMA. The SMA wire may have any shape that is suitable for the purposes described herein. The SMA wire may be elongate and may have a round cross section or any other shape cross section. The cross section may vary along the length of the SMA wire. It is also possible that the length of the SMA wire (however defined) may be similar to one or more of its other dimensions. The SMA wire may be pliant or, in other words, flexible. In some examples, when connected in a straight line between two elements, the SMA wire can apply only a tensile force which urges the two elements together. In other examples, the SMA wire may be bent around an element and can apply a force to the element as the SMA wire tends to straighten under tension. The SMA wire may be beam-like or rigid and may be able to apply different (e.g. non-tensile) forces to elements. The SMA wire may or may not include material(s) and/or component(s) that are not SMA. For example, the SMA wire may comprise a core of SMA and a coating of non-SMA material. Unless the context requires otherwise, the term 'SMA wire' may refer to any configuration of SMA wire acting as a single actuating element which, for example, can be individually controlled to produce a force on an element. For example, the SMA wire may comprise two or more portions of SMA wire that are arranged mechanically in parallel and/or in series. In some arrangements, the SMA wire may be part of a larger piece of SMA wire. Such a larger piece of SMA wire might comprise two or more parts that are individually controllable, thereby forming two or more SMA wires.

Other Variations

It will be appreciated that there may be many other variations of the above-described examples.

In some variations of the second (or third) example, the second actuator may include both a lens shift actuator and a sensor shift actuator and may correspond to the first example of the actuator arrangement 100.

The lens 101, 201, 301, 701 is generally also movable along its optical axis so as to enable autofocusing.

The actuator arrangement may be used in contexts other than cameras and/or for uses other than autofocus.

The invention claimed is:

1. An actuator arrangement for use in a camera, wherein the camera comprises two or more camera elements including an image sensor and one or more optical elements for forming, or aiding forming of, an image of an object on the image sensor, the actuator arrangement comprising:
 a first part defining a first axis;
 a first actuator for providing a first type of movement of one or more of the camera elements relative to the first part;
 a second actuator for providing a second, different type of movement of one or more of the camera elements relative to the first part; and
 a controller configured to (a) cause the first actuator to move one or more of the camera elements to provide a first optical image stabilisation (OIS) effect, and (b) cause the second actuator to move one or more of the camera elements to provide a second OIS effect, wherein the first and second OIS effects combine to provide an overall OIS effect that is greater than either of the first and second OIS effects;
 wherein the one or more optical elements comprise a lens for focusing, or aiding focusing of, an image of an object onto the image sensor;
 wherein the first actuator is for tilting a module comprising the lens and the image sensor relative to the first axis;
 wherein the second actuator is for moving at least one of the lens or the image sensor relative to the module in any direction in a plane perpendicular to an optical axis of the lens; and
 wherein the controller is configured to:
  obtain a first input signal indicative of motion of the first part relative to the object, the first input signal originating from a sensor that is fixed relative to the first part;
  provide a first control signal to the first actuator, wherein the first control signal is derived from the first input signal;
  obtain a position signal indicative of the position of the first actuator; and
  provide a second control signal to the second actuator, wherein the second control signal is derived from the first input signal and from the position signal.

2. The actuator arrangement according to claim 1, wherein:
 the first actuator is for moving the lens relative to the first part in any direction in a plane orthogonal to the first axis; and
 the second actuator is for moving the image sensor relative to the first part in any direction in a plane orthogonal to the first axis.

3. The actuator arrangement according to claim 2, wherein:
 the controller is configured, in response to a determination of a desired OIS effect, to (a) cause the first actuator to cause the lens to move in a first direction relative to the first part, and (b) cause the second actuator to cause the image sensor to move in a second direction relative to the first part; and
 the second direction is opposite to the first direction.

4. The actuator arrangement according to claim 1, wherein the one or more optical elements comprise a reflecting element for redirecting the optical path.

5. The actuator arrangement according to claim 4, wherein:
 the first actuator is for tilting the reflecting element to move the image on the image sensor in any direction;
 the one or more optical elements comprise a lens for focusing, or aiding focusing of an image of an object onto the image sensor; and
 the second actuator is for moving one of the lens and the image sensor relative to the first part in any direction in a plane orthogonal to the first axis.

6. The actuator arrangement according to claim 5, comprising:
 a third actuator for moving the other one of the lens and the image sensor relative to the first part in any direction in a plane orthogonal to the first axis;
 wherein the controller is configured to (c) cause the third actuator to move the other one of the lens and the image sensor to provide a third OIS effect.

7. The actuator arrangement according to claim 1, wherein:
 the controller is configured to (a) cause the first actuator to move one or more of the camera elements to primarily compensate for movement of the image on the image sensor in a first frequency range, and (b) cause the second actuator to move one or more of the camera elements to primarily compensate for movement of the image on the image sensor in a second, different frequency range; and
 the movement in the first frequency range comprises movement with lower frequencies and higher amplitudes than the movement in the second frequency range.

8. The actuator arrangement according to claim 1, wherein the controller is configured to:
 obtain an input signal indicative of motion of the camera relative to the object, the input signal originating from a sensor that is fixed relative to the first part;

provide a first control signal to the first actuator, wherein the first control signal is derived from the input signal; and provide a second control signal to the second actuator, wherein the second control signal is derived from the input signal and a signal indicative of the position of the first actuator.

9. The actuator arrangement according to claim 1, comprising:
a first movable part for supporting one or more of the camera elements that are movable relative to the first part; and
a second movable part for supporting one or more of the camera elements that are movable relative to the first part and/or the first movable part, wherein:
the first actuator is for moving the first movable part relative to the first part; and
the second actuator is for moving the second movable part relative to the first part and/or the first movable part.

10. The actuator arrangement according to claim 1, wherein the first actuator, the second actuator or each of the first and second actuators comprises a shape memory alloy (SMA) actuator.

11. A method of controlling an actuator arrangement for use in a camera, wherein the camera comprises two or more camera elements including an image sensor and one or more optical elements for forming, or aiding forming of, an image of an object on the image sensor, the actuator arrangement comprising:
a first part defining a first axis;
a first actuator for providing a first type of movement of one or more of the camera elements relative to the first part; and
a second actuator for providing a second, different type of movement of one or more of the camera elements relative to the first part; and
wherein the one or more optical elements comprise a lens for focusing, or aiding focusing of, an image of an object onto the image sensor;
the method comprising:
causing the first actuator to move one or more of the camera elements to provide a first optical image stabilisation (OIS) effect; and
causing the second actuator to move one or more of the camera elements to provide a second OIS effect, wherein the first and second OIS effects combine to provide an overall OIS effect that is greater than either of the first and second OIS effects;
causing the second actuator to move at least one of the lens or the image sensor relative to the module in any direction in a plane perpendicular to an optical axis of the lens;
obtaining a first input signal indicative of motion of the first part relative to the object, the first input signal originating from a sensor that is fixed relative to the first part;
providing a first control signal to the first actuator, wherein the first control signal is derived from the first input signal;
obtaining a position signal indicative of the position of the first actuator; and
providing a second control signal to the second actuator, wherein the second control signal is derived from the first input signal and from the position signal.

12. The method according to claim 11, wherein the one or more optical elements include:
a reflecting element for redirecting the optical path.

* * * * *